United States Patent
Corattiyil et al.

(10) Patent No.: US 6,443,698 B1
(45) Date of Patent: Sep. 3, 2002

(54) METHOD AND APPARATUS FOR CENTERING ROTOR ASSEMBLY DAMPER BEARINGS

(75) Inventors: Bala Corattiyil, Cincinnati; Barry Lynn Allmon, Maineville, both of OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/770,327

(22) Filed: Jan. 26, 2001

(51) Int. Cl.[7] .......................... F01D 29/04; F16C 27/04; F04D 29/66
(52) U.S. Cl. .................... 416/1; 415/174.2; 384/581
(58) Field of Search .................. 415/110, 111, 415/113, 170.1, 174.2, 229, 1; 384/99, 581, 517, 483

(56) References Cited

U.S. PATENT DOCUMENTS

| | | | | |
|---|---|---|---|---|
| 3,460,873 A | * | 8/1969 | Roney ...................... 384/535 |
| 3,738,719 A | * | 6/1973 | Langner .................... 384/517 |
| 4,214,796 A | * | 7/1980 | Monzel ................. 384/581 X |
| 4,313,712 A | | 2/1982 | Briggs |
| 4,375,906 A | | 3/1983 | Roberts et al. |
| 4,400,098 A | * | 8/1983 | Lacey et al. ............ 384/517 X |
| 4,429,923 A | * | 2/1984 | White et al. .................. 384/99 |
| 4,453,890 A | | 6/1984 | Brantley |
| 4,527,912 A | * | 7/1985 | Klusman .................... 384/99 |
| 4,676,667 A | * | 6/1987 | Komatsu et al. ............... 384/99 |
| 4,687,346 A | * | 8/1987 | Suciu ........................... 384/99 |
| 4,827,712 A | | 5/1989 | Coplin |
| 4,872,767 A | * | 10/1989 | Knapp ........................ 384/99 |
| 4,971,457 A | * | 11/1990 | Carlson ....................... 384/99 |
| 5,433,584 A | | 7/1995 | Amin |
| 5,603,602 A | * | 2/1997 | Romani .................. 415/229 X |
| 5,735,666 A | * | 4/1998 | Johnston ................. 384/517 X |
| 5,974,782 A | | 11/1999 | Gerez |
| 6,002,778 A | | 12/1999 | Rossetti et al. |
| 6,073,439 A | | 6/2000 | Beaven et al. |
| 6,098,399 A | | 8/2000 | Richards et al. |
| 6,099,165 A | * | 8/2000 | Tremaine .................... 384/99 |
| 6,109,022 A | | 8/2000 | Allen et al. |
| 6,240,719 B1 | | 6/2001 | Vondrell et al. |

FOREIGN PATENT DOCUMENTS

GB 2 192 233 A 1/1988

* cited by examiner

*Primary Examiner*—John E. Ryznic
(74) *Attorney, Agent, or Firm*—Nathan D. Herkamp; Armstrong Teasdale LLP; Robert B. Reeser, III

(57) ABSTRACT

A rotor assembly for a gas turbine engine including a bearing centering sub-assembly that facilitates reduces an effect of radial forces transmitted to a bearing assembly is described. The bearing assembly supports a rotor shaft with a rolling element positioned radially inward from an outer race. The bearing centering sub-assembly is coupled to the outer race and includes a plurality of first springs and a plurality of second springs extending circumferentially in rows. Each first springs is coupled between a second spring and the outer race such that each first spring is radially aligned with respect to each second spring.

20 Claims, 3 Drawing Sheets

METHOD AND APPARATUS FOR CENTERING ROTOR ASSEMBLY DAMPER BEARINGS

BACKGROUND OF THE INVENTION

This application relates generally to gas turbine engine rotor assemblies and, more particularly, to bearing assemblies for gas turbine engine rotor assemblies.

Gas turbine engines typically includes a fan rotor assembly, a compressor, and a turbine. The fan rotor assembly includes a fan including an array of fan blades extending radially outward from a rotor shaft. The rotor shaft transfers power and rotary motion from the turbine to the compressor and the fan, and is supported longitudinally with a plurality of bearing assemblies. Bearing assemblies support the rotor shaft and typically include rolling elements located within an inner race and an outer race.

Additionally, at least some known bearing assemblies include a plurality of identical springs attached to the bearing outer race. The springs are spaced equally in a single row circumferentially around the rotor shaft to provide radial stiffness to the bearing and to center the outer race with respect to the support frame. A first end of the springs is attached to the bearing assembly outer race, and a second end of the springs is attached to a flange coupled to a support frame.

During operation, an unbalance within the engine may cause the engine rotor shaft to displace radially. The radial displacements of the shaft are transmitted to the bearing assembly. Because the springs are arranged in parallel the deflection of each spring is the same. A parallel configuration facilitates optimizing the weight of the bearing assembly by utilizing a shorter axial space. However, this configuration also reduces the spring bending stresses, thus increasing fatigue life. In this stress field, a generic single row configuration would require more springs, a greater material strength, greater cross-sectional inertia, and/or an increased spring length. As a result, a cost and weight of the bearing assembly would increase.

To minimize the effects of potentially damaging radial forces, the number of springs, the cross-sectional area, and the length of the springs are often increased. As a result, the cost and weight of the bearing assembly is also increased.

BRIEF SUMMARY OF THE INVENTION

In an exemplary embodiment, a rotor assembly for a gas turbine engine includes a bearing centering sub-assembly that facilitates reducing radial forces transmitted to a bearing assembly. The bearing assembly supports a rotor shaft with a rolling element positioned radially inward from an outer race. The bearing centering sub-assembly is coupled to the outer race and includes a plurality of first springs and a plurality of second springs arranged in separate rows that extend circumferentially around the rotor assembly rotor shaft. The row of first springs is coupled between the row of second springs and the outer race such that each first spring is radially aligned with respect to each second spring. The row of second springs is coupled between the row of first springs and an engine support frame.

During normal operation, radial forces to the support frame are minimized with a bearing damper system including an oil plenum and springs. The oil plenum is formed by a radial gap extending between the outer race and the support frame. The spring stiffness dictates a natural frequency for the rotor, and the oil plenum controls the frequency response or radial deflection. The springs are beams arranged circumferentially around the rotor shaft, and center the outer race with respect to the support frame, such that the oil plenum is defined.

A plurality of beam properties determines a spring stiffness of each beam. More specifically, a cross sectional inertia, a material modulus of elasticity, a length of each beam determines the spring stiffness. In addition, as the number of beams is increased, the spring stiffness is increased. The spring stiffness is selected such that as the rotor deflects with respect to the support frame, the oil plenum dampens radial forces induced to the support frame.

During normal rotor unbalances, spring stresses are a function of length. The parallel configuration reduces bending stresses by approximately fifty percent in comparison the single row configuration. In addition, the parallel configuration also increases fatigue life in comparison the single row configuration.

During high rotor unbalance, the outer race spring deflection is significant to bottom the radial gap in the oil plenum. A circumferential force is created on the outer race springs yielding the beams in bending. Because the springs are parallel, all springs are reduced in length an equal amount. Accordingly, a net axial translation or displacement of the bearing assembly rolling element is approximately zero.

DETAILED DESCRIPTION OF THE INVENTION

Figure 1:
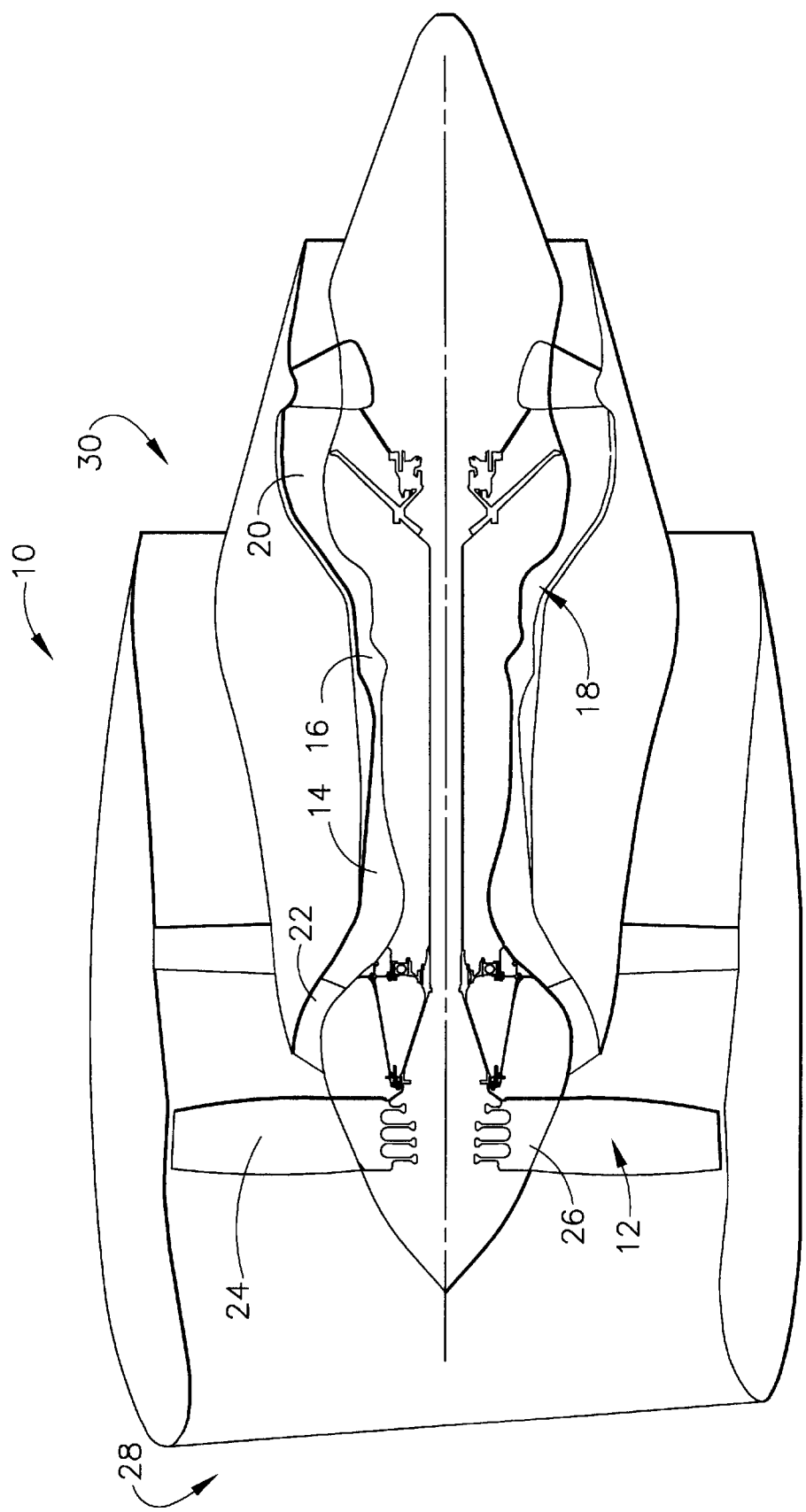
FIG. 1 is schematic illustration of a gas turbine engine.

FIG. 1 is a schematic illustration of a gas turbine engine 10 including a fan assembly 12, a high pressure compressor 14, and a combustor 16. Engine 10 also includes a high pressure turbine 18, a low pressure turbine 20, and a booster 22. Fan assembly 12 includes an array of fan blades 24 extending radially outward from a rotor disc 26. Engine 10 has an intake side 28 and an exhaust side 30.

In operation, air flows through fan assembly 12 and compressed air is supplied to high pressure compressor 14. The highly compressed air is delivered to combustor 16. Airflow (not shown in FIG. 1) from combustor 16 drives turbines 18 and 20, and turbine 20 drives fan assembly 12.

Figure 2:
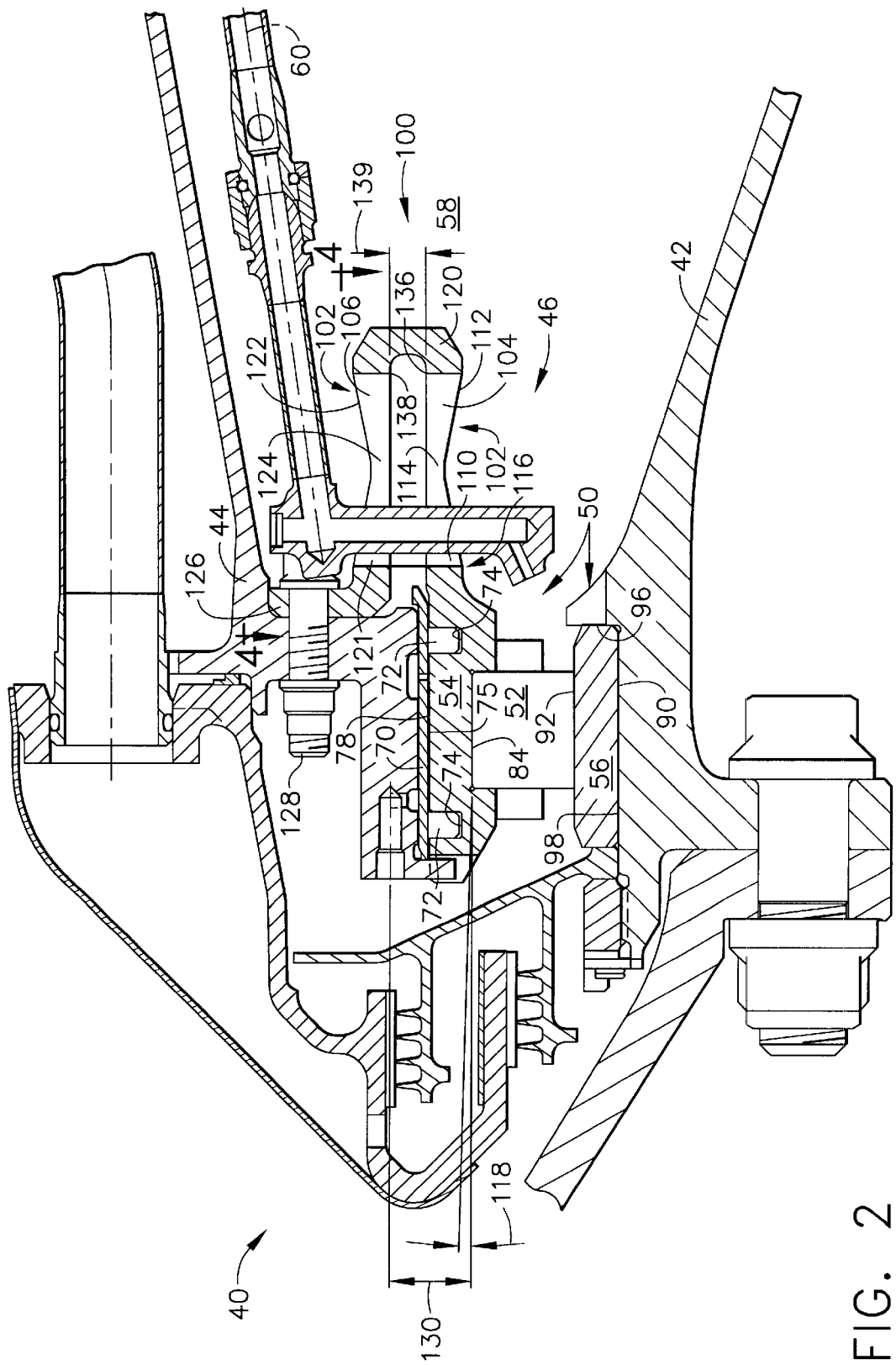
FIG. 2 is a cross-sectional view of an exemplary embodiment of a rotor assembly used in the gas turbine engine shown in FIG. 1.

FIG. 2 is a cross-sectional view of an exemplary embodiment of a rotor and bearing assembly 40 that may be used with a gas turbine engine, such as engine 10 shown in FIG. 1. In one embodiment, the gas turbine engine is a GE90 available from General Electric Company, Cincinnati, Ohio. Rotor and bearing assembly 40 includes rotor disc 26 (shown in FIG. 1) and a rotor shaft 42 which supports an array of fan blades 24 (shown in FIG. 1) that extend radially outward from rotor disc 26. Rotor shaft 42 is rotatably secured to a structural support frame 44 with a plurality of bearing assemblies 46 that support rotor shaft 42. In one embodiment, bearing assembly 46 is a fan thrust bearing (not shown), and is known as an engine number one bearing. In an alternative embodiment, bearing assembly 46 supports a compressor rotor (not shown).

In an exemplary embodiment, each bearing assembly 46 includes a paired race 50 and a rolling element 52. In one embodiment, bearing assembly 46 is a damper bearing. Paired race 50 includes an outer race 54 and an inner race 56 radially inward from outer race 54. Rolling element 52 is located between inner race 56 and outer race 54. Bearing assembly 46 is enclosed within a sealed annular compartment 58 radially bounded by rotor shaft 42 and bearing support 44. Bearing support 44 fails when exposed to a pre-determined moment load, but withstands normal engine operating loads.

Support frame 44 includes an annular support sleeve 70 and a plurality of rings 72 sized to be received within a plurality of slots 74 defined within outer race 54. Outer race 54 is positioned such that a gap 75 is defined between race 54 and annular support sleeve 70. A face 84 of outer race 54 receives rolling element 52 in rollable contact.

Inner race 56 includes an inner surface 90 and an inner face 92 that receives rolling element 52 in rollable contact. Inner race 56 is secured within a recess 96 in shaft 42 such that inner race inner surface 90 is adjacent an outer surface 98 of recess 96.

A bearing centering sub-assembly 100 positions bearing assembly 46 within rotor assembly 40. More specifically, bearing centering sub-assembly 100 centers outer race 54 within bearing assembly 46. Bearing centering sub-assembly 100 includes a plurality of springs 102 that extend circumferentially around engine 10. More specifically, bearing centering sub-assembly 100 includes a plurality of first springs 104 and a plurality of second springs 106. First springs 104 and 106 extend circumferentially around engine 10 in rows (not shown in FIG. 2).

Each bearing centering sub-assembly first spring 104 includes a forward end 110, an aft end 112, and a body 114 extending therebetween. Each first spring forward end 110 is coupled to a downstream side 116 of outer race 54, such that first spring body 114 extends downstream from outer race 54. More specifically, each first spring 104 is attached a radial distance 118 outward from rolling element 52. Each first spring aft end 112 is coupled to an annular elbow 120 downstream from bearing assembly 46 within sealed annular compartment 58.

Each bearing centering sub-assembly second spring 106 includes a forward end 121, an aft end 122, and a body 124 extending therebetween. Each second spring forward end 121 includes a flange 126 that is coupled to support frame 44 with a fastener 128, such that second spring body 124 extends downstream from support frame 44. Additionally, as fastener 128 secures flange 126 to support frame 44, outer race 54 is then secured in position to support frame 44.

Each bearing centering sub-assembly second spring 106 is attached a radial distance 130 outward from rolling element 52. Radial distance 130 is greater than radial distance 118. Each second spring aft end 122 is coupled to annular elbow 120 downstream from bearing assembly 46 within sealed annular compartment 58, such that annular elbow 120 extends between bearing centering sub-assembly springs 104 and 106.

Bearing centering sub-assembly first and second spring bodies 114 and 124 each include an inner surface 136 and 138, respectively. Because each surface 136 and 138 is substantially planar, and because spring bodies 114 and 124 are substantially parallel, a distance 139 between bearing centering sub-assembly springs 104 and 106 remains substantially constant.

During engine operation, in the exemplary embodiment, an unbalance of engine 10 may cause high radial forces to be applied to fan assembly 12 (shown in FIG. 1) and bearing assembly 46. More specifically, during engine operation, high rotor deflection may induce radial movement of outer race 54. The radial force is transmitted to support frame 44 through bearing centering sub-assembly 100. More specifically, as outer race 54 is forced radially outward as a result of rotor deflection, because bearing centering sub-assembly first spring 104 is attached to outer race 54, the radial movement is transmitted to bearing centering sub-assembly first spring 104.

Furthermore, because bearing centering sub-assembly springs 104 and 106 are coupled with annular elbow 120, the radial force is then transmitted through bearing centering sub-assembly second spring 106 to support frame 44, and no torsional forces are induced within annular elbow 120. More specifically, because springs 104 and 106 are coupled with annular elbow 120, when rotor shaft 42 deflects, spring 104 is radially displaced a distance (not shown) that is equal to a distance (not shown) spring 106 is radially displaced.

A sum of the amount of deflection of springs 104 and 106 is equal to a total deflection at outer race 54. A total radial stiffness of bearing centering sub-assembly 100 is given by:

$$\frac{1}{K_1} + \frac{1}{K_2} = \frac{1}{K_t} \quad (1)$$

12 where $K_1$, is a stiffness of spring 104, $K_2$ is a stiffness of spring 106, and $K_t$ is a total stiffness for bearing centering sub-assembly 100.

Figure 3:
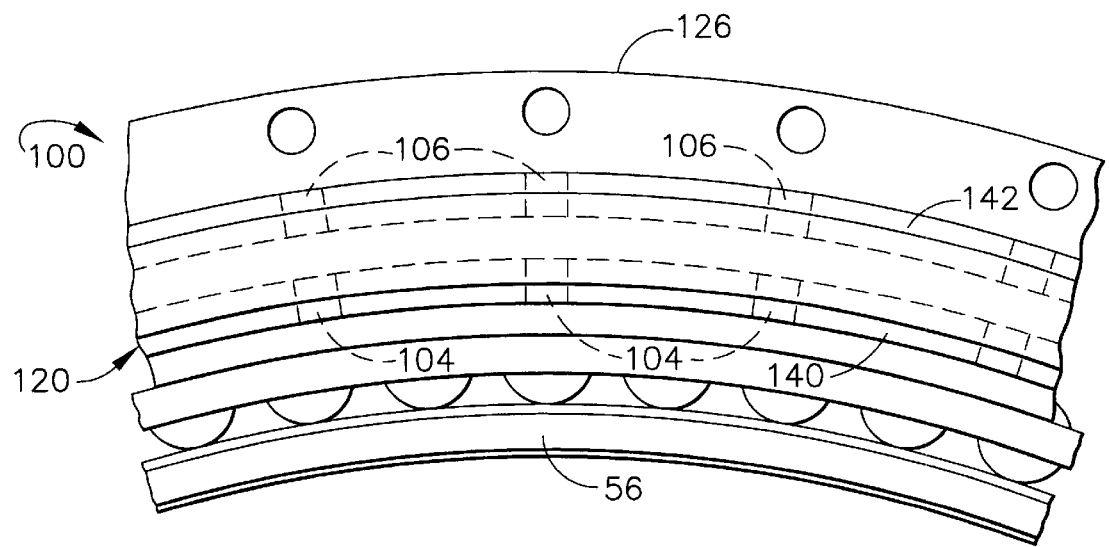
FIG. 3 is a partial end view of a bearing centering sub-assembly used with the rotor assembly shown in FIG. 2.
Figure 4:
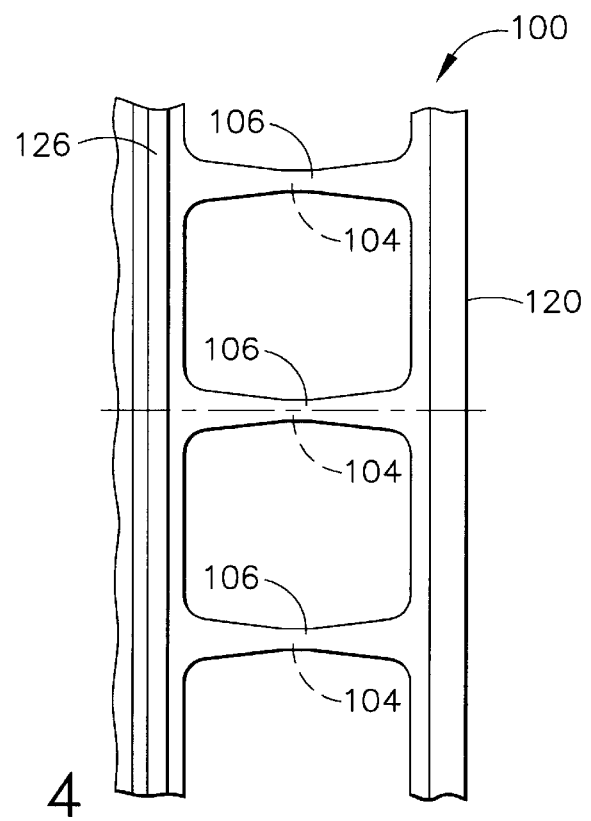
FIG. 4 is a radial view of the bearing centering sub-assembly shown in FIG. 3.

FIG. 3 is a partial end view of bearing centering sub-assembly 100. FIG. 4 is a top view of bearing centering sub-assembly 100. Bearing centering sub-assembly first springs 104 and second springs 106 extend circumferentially around engine 10 (shown in FIGS. 1 and 2) in rows 140 and 142, respectively. Additionally, because each row 140 and 142 of springs 104 and 106, respectively, is coupled with annular elbow 120, springs 104 and 106 are sometimes referred to as serially connected or doubled back, and in a hair-pin arrangement.

More specifically, bearing centering sub-assembly springs 104 and 106 are oriented circumferentially such that each first spring 104 is radially aligned with respect to each second spring 106, as shown in FIG. 4. As a result, when bearing centering sub-assembly 100 is not anti-rotated, both springs 104 and 106 yield in bending and reduce in length by an equal amount when circumferential force is transmitted to bearing centering sub-assembly 100. Circumferential force is created when rotor unbalance loads are significant such that the radial gap between race 54 and support sleeve 70 is diminished or bottomed. This results in a net axial translation or displacement of rolling elements 52 on bearing inner race surface 92 equal approximately zero.

Additionally because bearing centering sub-assembly springs 102 connected serially, springs 104 and 106 have approximately fifty percent less stress than non-serially connected springs (not shown) for a given system stiffness due to each spring's deflection being half of the total deflection. This facilitates longer fatigue life for a given rotor unbalance load.

The above-described rotor assembly is cost-effective and highly reliable. The rotor assembly includes a bearing centering sub-assembly that includes a first spring and a second spring coupled with an annular elbow. During operation, when the rotor shaft is displaced, the bearing centering sub-assembly springs facilitate reducing the effect of the radial forces on the bearing assembly by transmitting the radial forces to the engine support frame, resulting in zero net displacement of the rolling element. As a result, the bearing centering sub-assembly facilitates extending a useful life of the bearing assembly in a cost-effective and reliable manner.

While the invention has been described in terms of various specific embodiments, those skilled in the art will recognize that the invention can be practiced with modification within the spirit and scope of the claims.

What is claimed is:

1. A method for reducing dynamic loading of a gas turbine engine rotor assembly, the engine including a rotor shaft, a support frame, and a bearing assembly including a bearing centering sub-assembly and a damper bearing, the bearing centering sub-assembly including a plurality of first springs and a plurality of second springs, said method comprising the steps of:

supporting the rotor shaft on the support frame with the bearing assembly;

coupling the bearing centering sub-assembly first spring to the bearing assembly second spring such that the each of the first springs is radially aligned with respect to each of the second springs; and operating the gas turbine engine such that radial forces within the rotor shaft are transmitted through the bearing centering sub-assembly to the support frame.

2. A method in accordance with claim 1 wherein the bearing centering sub-assembly further includes an annular elbow, said step of coupling the bearing centering sub-assembly further comprises the steps of:

coupling the bearing centering sub-assembly first spring between the bearing and the annular elbow; and coupling the bearing centering sub-assembly second spring between the support frame and the annular elbow.

3. A method in accordance with claim 1 wherein said step of coupling the bearing centering sub-assembly further comprises the steps of:

coupling the bearing centering sub-assembly first spring a first radial distance from the damper bearing; and coupling the bearing centering sub-assembly second spring a second radial distance from the damper bearing, such that the second radial distance is greater than the first radial distance.

4. A method in accordance with claim 1 wherein said step of coupling the bearing centering sub-assembly further comprises the step of coupling the bearing centering sub-assembly first spring to the bearing centering sub-assembly second spring, such that the first spring and the second spring are deflected an identical distance when subjected to radial force.

5. A method in accordance with claim 1 wherein said step of operating the gas turbine engine further comprises the step of operating the gas turbine engine such that radial forces within the rotor shaft are transmitted through the bearing centering sub-assembly first spring to the bearing centering sub-assembly second spring.

6. A bearing assembly for a gas turbine engine rotor, said bearing assembly comprising:

a damper bearing configured to support the rotor; and a bearing centering sub-assembly configured to position said bearing relative to the rotor, said bearing centering apparatus sub-assembly comprising a plurality of first springs and a plurality of second springs, each of said first springs radially aligned with respect to each of said second springs.

7. A bearing assembly in accordance with claim 6 wherein said plurality of said second springs are a first radial distance from said bearing, said plurality of said first springs are a second radial distance from said bearing, said second radial distance greater than said first radial distance.

8. A bearing assembly in accordance with claim 7 wherein each of said plurality of first springs connected to each of said second springs.

9. A bearing assembly in accordance with claim 7 wherein said bearing centering sub-assembly further comprises an annular elbow connected to at least one of said plurality of second springs and said plurality of first springs.

10. A bearing assembly in accordance with claim 9 wherein each of said plurality of first springs attached to said annular elbow, each of said plurality of second springs attached to said annular elbow.

11. A bearing assembly in accordance with claim 9 wherein said annular elbow extends between said plurality of first springs and said plurality of second springs.

12. A bearing assembly in accordance with claim 7 wherein said plurality of first springs and said plurality of second springs deflect an identical distance when subjected to radial force.

13. A rotor assembly comprising:

a rotor shaft; and a bearing assembly configured to support said rotor shaft on a support frame such that dynamic loads to the support frame are reduced, said bearing assembly comprising a bearing centering sub-assembly and a damper bearing, said bearing centering sub-assembly configured to position said bearing relative to said rotor shaft, said bearing centering sub-assembly comprising a plurality of first springs and a plurality of second springs, each of said first springs radially aligned with respect to each of said second springs.

14. A bearing assembly in accordance with claim 13 wherein said bearing centering sub-assembly plurality of said second springs are a first radial distance from said damper bearing, said bearing centering sub-assembly plurality of said first springs are a second radial distance from said damper bearing.

15. A bearing assembly in accordance with claim 14 wherein said second radial distance greater than said first radial distance.

16. A bearing assembly in accordance with claim 14 wherein said bearing centering sub-assembly further comprises an annular elbow.

17. A bearing assembly in accordance with claim 16 wherein said bearing centering sub-assembly plurality of first springs connected to said plurality of second springs with said annular elbow.

18. A bearing assembly in accordance with claim 16 wherein each of said bearing centering sub-assembly first springs comprise a first end and a second end, said first spring first ends coupled to said damper bearing, said first spring second ends coupled to said annular elbow.

19. A bearing assembly in accordance with claim 18 wherein each of said bearing centering sub-assembly second springs comprise a first end and a second end, said second spring first ends coupled to the support frame, said first spring second ends coupled to said annular elbow.

20. A bearing assembly in accordance with claim 14 wherein said bearing centering sub-assembly plurality of first springs and plurality of second springs deflect an identical distance when subjected to radial force.

\* \* \* \* \*